Sept. 26, 1950  J. LLOYD  2,523,579
CONTROL OF AIRCRAFT
Filed July 30, 1947  4 Sheets-Sheet 1
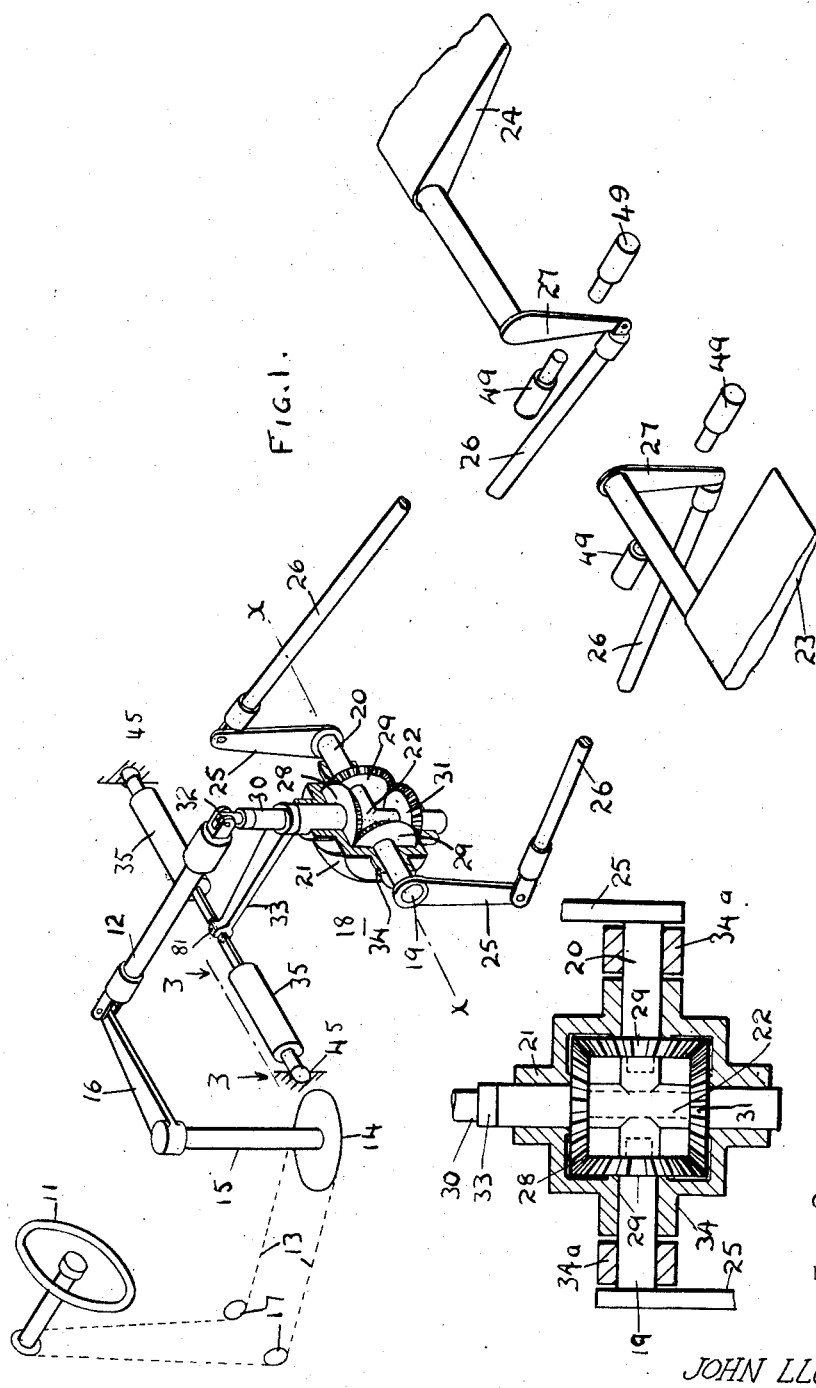
Inventor
JOHN LLOYD
By
Mawhinney & Mawhinney
Attorneys Sept. 26, 1950 J. LLOYD 2,523,579
CONTROL OF AIRCRAFT
Filed July 30, 1947 4 Sheets-Sheet 2
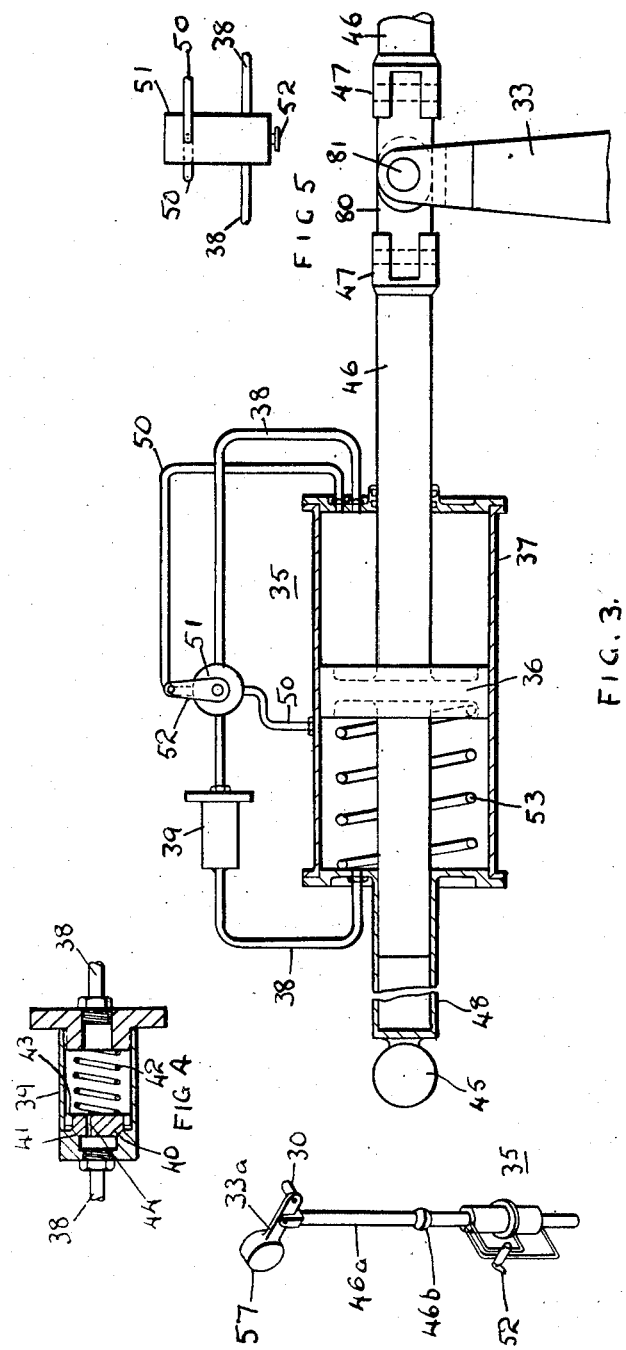
Inventor
JOHN LLOYD
By Mawhinney & Mawhinney
Attorneys

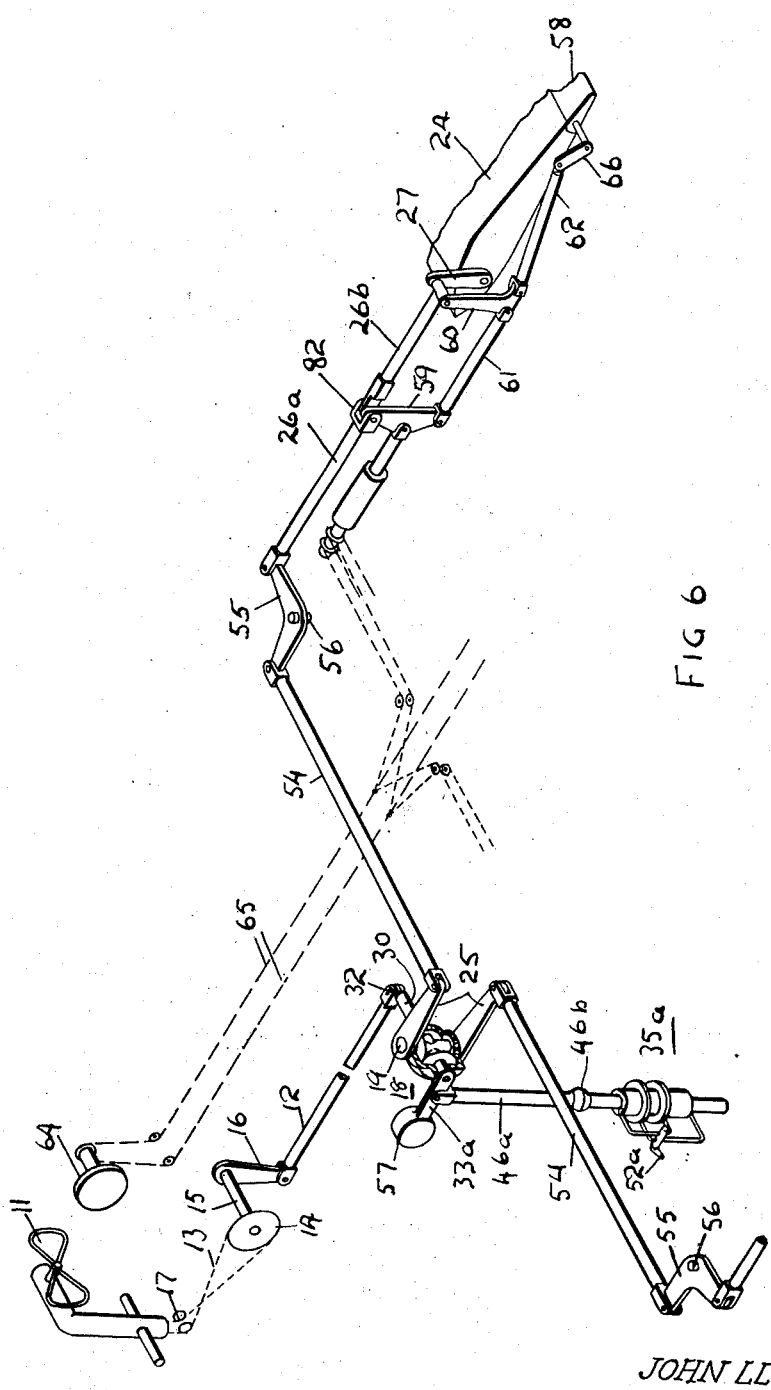

Sept. 26, 1950  J. LLOYD  2,523,579
CONTROL OF AIRCRAFT
Filed July 30, 1947  4 Sheets-Sheet 4
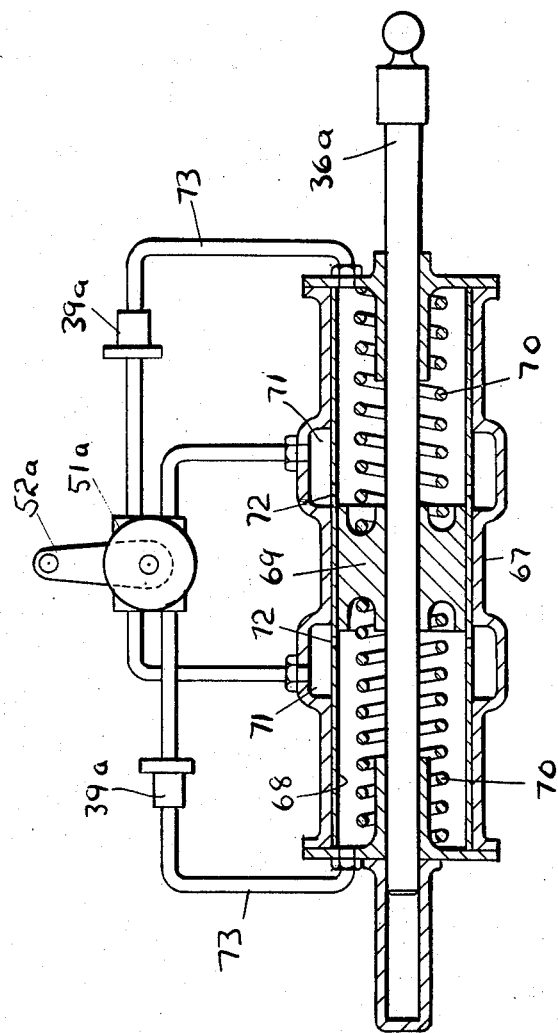
Inventor
JOHN LLOYD
By
Mawhinney & Mawhinney
Attorney Patented Sept. 26, 1950

2,523,579

UNITED STATES PATENT OFFICE 2,523,579

CONTROL OF AIRCRAFT

John Lloyd, Coventry, England, assignor to Sir W. G. Armstrong Whitworth Aircraft Limited, Coventry, England Application July 30, 1947, Serial No. 764,690
In Great Britain October 21, 1946

10 Claims. (Cl. 244—83)

This invention relates to an aircraft of the kind having a tail plane and wings with ailerons, the wings being such that the ailerons are more or less in line with the centre of gravity of the aircraft. That is to say, the wings are certainly not swept back to such an extent as would bring the ailerons well behind the centre of gravity—nor vice versa. The median lines of the chords of the wings will, in ordinary conditions, be slightly swept forward.

The main object is to provide improvements which will reduce the acceleration or "g" encountered by passengers when a change of incidence takes place suddenly—i. e., as a result of a gust. Whilst this may not be an important matter at speeds of the order of, say, 200 miles per hour, at much greater speeds—for example, speeds of 400 miles per hour—the "g" in these conditions is correspondingly increased, and it is, therefore, very important that it should be reduced in such conditions.

An advantage of the invention is that it serves also for reducing the bending moment on the wings when a sudden change of incidence occurs.

The invention broadly consists in this, that the main control for the ailerons is connected with the ailerons by a mechanism which will additionally allow the ailerons to move non-differentially (i. e., both up together, or both down together) in response to sudden changes of incidence, whereby to reduce the "g" (and also the bending moment on the wings) resulting from gusts encountered by the aircraft.

Naturally, the mechanism must be such that the pilot can still operate the airlerons differentially even if, in addition, they are both being or have both been moved automatically upwardly or downwardly dependently upon the direction of the change of incidence.

According to a further feature of the invention, the mechanism is such as to allow of relatively-free non-differential movement of the ailerons in the appropriate direction in response to a sudden change of incidence, whilst restricting the return movement thereof to the neutral position. Stops, to limit the non-differential movement of the ailerons to the extreme positions, should be adapted quickly to absorb energy (when engaged by the ailerons) and relatively slowly to return the energy, or resume their non-stressed condition.

For preference the ailerons are pressure balanced, for example, as described in British Patent Specification No. 568,910.

The invention further consists in means whereby the ailerons can at will be locked against such non-differential movement. For example, it may at times, when conditions are smooth, be unnecessary and inadvisable for the ailerons to have this freedom of non-differential movement.

Of the accompanying drawings:

Figure 1 is a diagrammatic lay-out, in perspective, of one form of the mechanism according to the invention, parts being shown broken away to facilitate illustration;

Figure 2 is a sectional elevation, to a larger scale, of the planetary gearing—looking from the right of Figure 1;

Figure 3 is an enlarged part-sectional elevation of one form of member for retarding the return of the ailerons after a non-differential movement, the view being in the direction of the arrows 3—3 of Figure 1;

Figure 4 is a longitudinal section, to a still larger scale, of the non-return valve and permanent leak of Figure 3;

Figure 5 is a plan view of the locking valve of Figure 3 and drawn to the same scale;

Figure 6 is a view similar to that of Figure 1 but showing a modified form of the mechanism and, additionally, a control means for trimming tabs of the ailerons;

Figure 7 is an enlarged part-sectional elevation of the member, employed with the construction of Figure 6, for retarding the return of the ailerons after a non-differential movement; and Figure 8 illustrates yet another arrangement for retarding the return movement of the ailerons after a non-differential movement.

In Figure 1 there is shown a main control, of known kind, for the ailerons, this control including an actuating wheel 11, of a control column, for imparting reversible longitudinal movement to a control rod 12 through a chain 13 and a sprocket 14 on a rockably-supported shaft 15 having an arm 16, fair leads for the chain being indicated at 17.

The rod 12 is connected to operate the ailerons through a planetary gearing 18. The latter comprises two coaxial shafts 19 and 20 which are journalled in a planet carrier 21 and spider 22 and differentially connected to the ailerons 23 and 24, respectively, through reversely-directed arms 25, fast with the shafts, and transmission rods 26 which are pivotally connected, at one end, to the arms 25 and, at the other end, to arms 27 which are fast with the ailerons. Stops 49 (one of which is partly obscured in Figure 1), fast with the aircraft, are provided for limiting aileron movement. These stops can be in the form of hydraulic piston and cylinder arrangements which can absorb the shock due to the ailerons reaching their limiting positions and which will recover slowly so as to avoid bouncing of the ailerons.

The planetary gearing includes a planet gear 28 intermeshing gears 29, 29 fast on the shafts 19 and 20 and rotatable in the planet carrier 21. The planet wheel 28 is also rotatably mounted about a shaft 30 which is journalled in the spider 22 and preferably carries an idle wheel 31 which is freely mounted thereon and intermeshes the gears 29, the shaft 30 being pivotally connected at 32 to the control rod 12. The planet wheel is fast with an arm 33 connected to the motion-damping means hereinafter described.

The planet carrier has lateral bosses 34 which abut bearings 34a, fast with the aircraft, for the shafts 19 and 20 so that the latter can move about the axis X—X of Figure 1. When the control rod 12 is moved (by actuation of the wheel 11) for normal differential movement of the ailerons 23 and 24 the planetary gearing rotates as a whole or solidly about the axis X—X, and the ailerons are differentially operated by the oppositely-directed arms 25. If, however, a sudden gust of wind is encountered (or the angle of incidence changes for any other reason) either during such normal operation, or otherwise, the ailerons can move non-differentially, the reversely-directed arms 25 (through their associated gears 29) applying a unidirectional rotation, to the planet wheel 28 to turn the arm 33 about the axis of the planet wheel.

The aforesaid motion-damping means comprises two oppositely-disposed abutment members 35 each of which is capable of allowing relatively free movement of the arm 33 when moved towards it in response to a change of incidence, whilst ensuring only a slow return of the ailerons to the neutral position. Each abutment member, see Figure 3, may comprise a plunger 36 loaded by a spring 53 and working in a hydraulic cylinder 37 the ends of which are interconnected by a passage-way 38 including an appropriate non-return valve, indicated at 39. This valve, see Figure 4, can include a movable member 40 held on a seating 41 by a spring 42 and having peripheral recesses 43 to permit the passage of the hydraulic fluid when the latter has opened the valve. The member 40 also has a bleed-hole 44 to allow a slower passage of the fluid, in the opposite direction, when the valve is closed.

The two cylinders 37 are normally aligned and have their outer ends universally pivoted at 45 to the airframe. The plungers 36 (in normal conditions) are disposed centrally of their cylinders and have their rods 46 pivoted on a horizontal axis at 47 to a member 80 which is pivoted on a vertical axis at 81 to the arm 33. The plunger rods are shown as extending through both ends of the cylinders, so that the latter are of constant volume, the outer ends of the rods being received in extensions 48.

The inner end of each cylinder is connected to a point thereof which is just on the outer side of the plunger, when the latter is in the mid-position, by a passage-way 50.

A cut-off valve 51 (see Figures 3 and 5), manually operable through means connected to an arm 52, controls both of the passage-ways 38 and 50.

Thus, the aileron can move non-differentially (either up or down) relatively quickly and against substantially little resistance (the outwardly-moving plunger opening the associated non-return valve 39, and the inwardly-moving plunger displacing the hydraulic fluid through the passage-way 50, to permit this). The return movement, however, is damped (i. e., can only take place slowly as, due to both ends of the passage 50 being then on the one side of the plunger, or one end of said passage being closed by the plunger, the hydraulic fluid is constrained to pass through the bleed-hole 44, the non-return valve being closed during this movement) and this prevents the ailerons from rapidly returning under the additional wind pressure encountered when first moving differentially from the neutral position, which would introduce a sudden rise of "g".

Furthermore, unless the stops 49 are capable of quickly absorbing energy, and returning it slowly, the ailerons would tend to rebound when moved fully against the stops.

By closing the cut-off valves 51 the arm 33 is locked and thereby locks the ailerons against non-differential movement, when the latter is not desired.

When an aircraft, equipped with the mechanism described above, is put into a climb or a dive by an adjustment of the elevator, there is a change of incidence which will cause the ailerons to be moved non-differentially. To minimise this the springs 53 can be so rated that, with the aircraft at cruising speed and of mean weight (i. e., when the weight of the fuel carried is at a mean value), they bias the ailerons to the zero position of adjustment and thus serve much in the fashion as trimming tabs. In this way, when the elevator is, for example, raised (to increase the angle of incidence—in which case the ailerons would tend also to rise, thereby reducing the angle of incidence) the springs will prevent the ailerons from rising in this manner. And vice versa.

Referring now to Figures 6 and 7, in which the parts which correspond with those previously described are indicated by the same reference numerals, the planetary gearing 18 is laid on its side and the arms 25 are connected to the transmission rods 26 (which in this case, for the purpose hereinafter described, are formed in two parts 26a, 26b hinged together at 82) through rods 54 and bell-cranks 55, the latter being pivoted at 56 to the airframe. The arm 33a, which in this case moves vertically, carries a bob-weight 57 at its outer end and is connected, at an intermediate point, to a single, double-acting, abutment member 35a, which is fast with the airframe, through the piston rod 46a which is articulated at 46b to the rod 36a.

Figure 6 shows a known form of control for aileron trimming tabs 58, the control including parallel links 59 and 60 (of which the former is pivoted, at the pivotal junction between the rod portions 26a and 26b, and the latter link at the pivotal connection of the rod portion 26b and the arm 27), connecting rods 61 and 62, and a double-threaded screw jack 63 which is operable from a control wheel 64 through cables 65, the connecting rod 62 being pivoted to an arm 66 fast with the tab.

The abutment member 35a is shown in greater detail in Figure 7 and comprises a cylinder 67, with a liner 68 containing a piston 69 which is fast with the rod 36a and is biassed to the central position by springs 70. The cylinder is formed with annular galleries 71 and the liner with ports 72 which respectively communicate therewith and which can be cut-off by the piston travel in the appropriate direction from the central position. The ends of the cylinder are respectively connected to the remoter of the two galleries by pipes 73, each containing a non-return valve 39a (similar to that shown in Figure 4) and jointly controlled by a cut-off valve 51a having an actuating arm 52a.

The arrangement is such that non-differential movement of the ailerons in one direction causes the piston 69 to move in the appropriate direction to close the port 72 in advance of it, thus causing a substantially free transfer of hydraulic fluid from in front of the piston to behind it through the associated non-return valve 39a, gallery 71 and port 72. The return movement is effected by the spring 70 which has been compressed by the piston movement and is delayed by the hydraulic fluid having to return through the bleed-hole 44 of the non-return valve which, of course, is now closed.

When the whole aircraft is flying in a bumpy atmosphere, the inertia of the bob-weight 57 operates the planet gearing to apply relieving movements to the ailerons.

The arrangement shown in Figure 8 is a modification of that shown in Figure 6, a single-acting abutment member 35 (similar to that shown in Figure 3) anchored to the airframe being substituted for the double-acting abutment member 35a of Figure 6. In the construction of Figure 6, however, there are two springs 53 (see Figure 3), one on each side of the piston 36 for maintaining the latter floatingly in its central position.

What I claim as my invention and desire to secure by Letters Patent of the United States is:

1. An aircraft of the kind having a tail plane, and wings with ailerons which are substantially in line with the centre of gravity of the aircraft, comprising a main control, a planetary gearing including two coaxial shafts, a driving connection between each said shaft and a respective aileron, a gear fast with each said shaft, a planet carrier, a planet gear rotatable in said carrier and intermeshing said shaft gears, and a connection between said carrier and said main control which does not restrain rotation of said planet gear on its axis, whereby an operation of the main control merely tilts the axis of said planet gear to rotate the carrier about the axis of said shafts for moving the ailerons differentially, the rotative support of said planet gear permitting non-differential movement of the ailerons in response to sudden changes of incidence of the air stream thereon without communicating a reaction force to said main control.

2. An aircraft of the kind having a tail plane, and wings with ailerons which are substantially in line with the centre of gravity of the aircraft, comprising a main control, a planetary gearing including two coaxial shafts, a driving connection between each said shaft and a respective aileron, a gear fast with each said shaft, a planet carrier, a planet gear rotatable in said carrier and intermeshing said shaft gears, a connection between said carrier and said main control which does not restrain rotation of said planet gear on its axis, whereby an operation of the main control merely tilts the axis of said planet gear to rotate the carrier about the axis of said shafts for moving the ailerons differentially, an arm fast with said planet gear, a pivotally mounted guide, a member guided by said guide, a hinged connection between said arm and guided member so that non-differential movement of the ailerons in response to sudden changes of incidence of the air stream thereon will rotate said planet gear on its axis to move said member along said guide without communicating a reaction force to said main control, and means reacting between said member and said guide for resisting the return movement of said member along said guide.

3. An aircraft of the kind having a tail plane and wings with ailerons which are substantially in line with the centre of gravity of the aircraft, comprising a main control, a planetary gearing including two coaxial shafts, a driving connection between each said shaft and a respective aileron, a gear fast with each said shaft, a planet carrier, a planet gear rotatable in said carrier and intermeshing said shaft gears, and a connection between said carrier and said main control which does not restrain rotation of said planet gear on its axis, whereby an operation of the main control merely tilts the axis of said planet gear to rotate the carrier about the axis of said shafts for moving the ailerons differentially, an arm fast with said planet gear, a hydraulic cylinder, a coacting hydraulic piston hinged to said arm, an external communication between the ends of said cylinder so that non-differential movement of the ailerons in response to sudden changes of incidence of the air stream thereon will rotate said planet gear on its axis to move said piston along said cylinder without communicating a reaction force to said main control, and means reacting between said cylinder and said piston for resisting the return movement of said piston.

4. An aircraft of the kind having a tail plane and wings with ailerons which are substantially in line with the centre of gravity of the aircraft, comprising a main control, a planetary gearing including two coaxial shafts, a driving connection between each said shaft and a respective aileron, a gear fast with each said shaft, a planet carrier, a planet gear rotatable in said carrier and intermeshing said shaft gears, and a connection between said carrier and said main control which does not restrain rotation of said planet gear on its axis, whereby an operation of the main control merely tilts the axis of said planet gear to rotate the carrier about the axis of said shafts for moving the ailerons differentially, an arm fast with said planet gear, a pair of opposed pivotally mounted guides, members respectively guided by said guides, a hinged connection means uniting said arm to both of said members so that non-differential movement of the ailerons in response to sudden changes of incidence of the air stream thereon will rotate said planet gear on its axis to move said members along their respective guides from a neutral position of said arm without communicating a reaction force to said main control, and means reacting between said respective guides and members for resisting the return movement of said members towards said neutral position.

5. An aircraft of the kind having a tail plane and wings with ailerons which are substantially in line with the centre of gravity of the aircraft, comprising a main control, a planetary gearing including two coaxial shafts, a driving connection between each said shaft and a respective aileron, a gear fast with each said shaft, a planet carrier, a planet gear rotatable in said carrier and intermeshing said shaft gears, and a connection between said carrier and said main control which does not restrain rotation of said planet gear on its axis, whereby an operation of the main control merely tilts the axis of said planet gear to rotate the carrier about the axis of said shafts for moving the ailerons differentially, an arm fast with said planet gear, an hydraulic cylinder, a coacting hydraulic piston hinged to said arm, a pair of lateral ports in said cylinder which just straddle the piston when the latter is centrally of the cylinder, an external communication between each said port and the remoter end of the cylinder, a non-return valve in each said communication permitting relatively-free movement of the piston away from said central position for permitting non-differential movement of the ailerons in response to sudden changes of incidence of the air stream thereon, said planet gear being rotated on its axis by said non-differential movement so as not to communicate a reaction force to said main control, a bleed-hole in each said non-return valve for causing the return movement of said piston to said central position to be delayed, and opposed springs for biassing said piston to said central position.

6. An aircraft, according to claim 3, having, in the said external communication between the ends of the said cylinder, a valve which can be moved to discontinue the communication so as to lock the ailerons against non-differential movement.

7. An aircraft, according to claim 3 and in which said hydraulic cylinder is arranged with its axis vertical, comprising a bob-weight fast with said arm, and a spring means normally urging said piston, against said bob-weight, to maintain said arm in a neutral position, said bob-weight, by its inertia, being for applying corrective non-differential movements to said ailerons when the aircraft is flying in a bumpy atmosphere.

8. An aircraft, according to claim 4, in which each guide is an hydraulic cylinder and each guided member is a coacting piston, comprising spring means for biassing the pistons normally to maintain said arm in its neutral position, a respective external communication for the ends of each cylinder, a non-return valve in each said communication for permitting relatively-free movement of the pistons inwardly of their cylinders to move said arm away from said neutral position, a bleed-hole in each said valve for delaying the return of said pistons to bring said arm into said neutral position, and a by-pass passage between that end of the cylinder adjacent the said arm and an intermediate point of the cylinder so that each said by-pass passage just straddles the coacting piston when said arm is in the neutral position for permitting relatively-free movement of said arm, from the neutral position, away from either cylinder.

9. An aircraft, according to claim 5, comprising stop valves in both of said external communications, and a single control for both of said stop valves for locking said ailerons against non-differential movement.

10. An aircraft, according to claim 5 and in which said hydraulic cylinder is arranged with its axis vertical, comprising a bob-weight fast with said arm, the aforesaid springs normally supporting said bob-weight with said piston in its central position, and said bob-weight, by its inertia, being for applying corrective non-differential movements to said ailerons when the aircraft is flying in a bumpy atmosphere.

JOHN LLOYD.

REFERENCES CITED

The following references are of record in the file of this patent:

UNITED STATES PATENTS

| Number | Name | Date |
| --- | --- | --- |
| 446,426 | Byron | Feb. 17, 1891 |
| 1,832,254 | Spanovic | Nov. 17, 1931 |
| 2,087,245 | DePort | July 20, 1937 |
| 2,092,424 | Potez | Sept. 7, 1937 |

FOREIGN PATENTS

| Number | Country | Date |
| --- | --- | --- |
| 542,833 | Germany | Jan. 29, 1932 |